US011308576B2

(12) United States Patent
Yuan et al.

(10) Patent No.: US 11,308,576 B2
(45) Date of Patent: Apr. 19, 2022

(54) VISUAL STYLIZATION ON STEREOSCOPIC IMAGES

(71) Applicant: Microsoft Technology Licensing, LLC, Redmond, WA (US)

(72) Inventors: Lu Yuan, Beijing (CN); Gang Hua, Sammamish, WA (US); Jing Liao, Redmond, WA (US); Dongdong Chen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/955,601

(22) PCT Filed: Jan. 8, 2019

(86) PCT No.: PCT/US2019/012588
§ 371 (c)(1),
(2) Date: Jun. 18, 2020

(87) PCT Pub. No.: WO2019/139858
PCT Pub. Date: Jul. 18, 2019

(65) Prior Publication Data
US 2020/0342570 A1 Oct. 29, 2020

(30) Foreign Application Priority Data
Jan. 15, 2018 (CN) .......................... 201810036211.9

(51) Int. Cl.
*G06T 3/00* (2006.01)
*G06T 7/593* (2017.01)
(Continued)

(52) U.S. Cl.
CPC .......... *G06T 3/0093* (2013.01); *G06T 3/0012* (2013.01); *G06T 7/593* (2017.01);
(Continued)

(58) Field of Classification Search
CPC ..... G06T 3/0093; G06T 7/593; G06T 3/0012; G06T 2207/20081; G06T 2207/20084;
(Continued)

(56) References Cited

U.S. PATENT DOCUMENTS 10,203,762 B2 2/2019 Bradsky et al.
2009/0109236 A1 4/2009 Xu et al.
(Continued)

FOREIGN PATENT DOCUMENTS

CN 102957927 A 3/2013
CN 103761295 A 4/2014
(Continued)

OTHER PUBLICATIONS

"Office Action and Search Report Issued in Chinese Papent Application No. 201611170887.4", dated Nov. 25, 2020, 14 Pages.
(Continued)

*Primary Examiner* — Chan S Park
*Assistant Examiner* — Daniel C Chang
(74) *Attorney, Agent, or Firm* — Schwegman Lundberg & Woessner, P.A.

(57) ABSTRACT

In accordance with implementations of the subject matter described herein, there is proposed a solution of visual stylization of stereoscopic images. In the solution, a first feature map for a first source image and a second feature map for a second source image are extracted. The first and second source images correspond to first and second views of a stereoscopic image, respectively. A first unidirectional disparity from the first source image to the second source image is determined based on the first and second source images. First and second target images having a specified visual style are generated by processing the first and second feature maps based on the first unidirectional disparity. Through the solution, a disparity between two source images
(Continued)

of a stereoscopic image are taken into account when performing the visual style transfer, thereby maintaining a stereoscopic effect in the stereoscopic image consisting of the target images.

15 Claims, 6 Drawing Sheets

(51) Int. Cl.
*H04N 13/156* (2018.01)
*H04N 13/00* (2018.01)

(52) U.S. Cl.
CPC . *H04N 13/156* (2018.05); *G06T 2207/20081* (2013.01); *G06T 2207/20084* (2013.01); *G06T 2207/20221* (2013.01); *H04N 2013/0081* (2013.01)

(58) Field of Classification Search
CPC ........ G06T 2207/20221; H04N 13/156; H04N 2013/0081; H04N 13/106
See application file for complete search history.

(56) References Cited

U.S. PATENT DOCUMENTS

| | | | | |
|---|---|---|---|---|
| 2013/0136337 | A1* | 5/2013 | Asente | G06T 19/20 382/154 |
| 2018/0211401 | A1* | 7/2018 | Lee | G06K 9/6202 |
| 2020/0082249 | A1 | 3/2020 | Hua et al. | |

FOREIGN PATENT DOCUMENTS

| | | | |
|---|---|---|---|
| CN | 104239855 | A | 12/2014 |
| CN | 104299258 | A | 1/2015 |
| CN | 104572965 | A | 4/2015 |
| CN | 105719327 | A | 6/2016 |
| CN | 106600713 | A | 4/2017 |
| CN | 106937531 | A | 7/2017 |
| EP | 3203412 | A1 | 8/2017 |
| KR | 101382595 | B1 | 4/2014 |

OTHER PUBLICATIONS

Xingquan, et al., "Design and Implementation of Image Color Style Transfer System for Mobile Phone Applications", In Journal of Information and Communication, Issue 6, Total Issue 162, Jun. 30, 2016, pp. 139-140.
"Office Action Issued in European Patent Application No. 17825335.7", dated Apr. 12, 2021, 5 Pages.
Chan, et al., "Show, Divide and Neural: Weighted Style Transfer", https://web.archive.org/web/20161216070323/http://cs231n.stanford.edu/reports2016/208_Report.pdf, Retrieved on: Dec. 16, 2016, 6 pages.
Chen, et al., "Towards Deep Style Transfer: A Content-Aware Perspective", In Proceedings of 27th British Machine Vision Conference, Sep. 19, 2016, pp. 1-11.
Dumoulin, et al., "Supercharging Style Transfer", https://research.googleblog.com/2016/10/supercharging-style-transfer.html, Oct. 26, 2016, 6 Pages.
"Supercharging Style Transfer (googleblog.com)", https://news.ycombinator.com/item?id=12798130, Oct. 26, 2016, 13 Pages.
Yamaguchi, et al., "Region-Based Painting Style Transfer", In Proceeding of SIGGRAPH Asia Technical Briefs, Nov. 2, 2015, 4 Pages.
Wang, et al., "Style Transfer via Image Component Analysis", In Journal of IEEE Transactions on Multimedia, vol. 15, Issue 7, Nov. 2013, pp. 1-8.
Xia, et al., "Every Filter Extracts a Specific Texture in Convolutional Neural Networks", In Journal of Computing Research Repository, Aug. 15, 2016, 5 Pages.

Torres, TJ, "Deep Style: Inferring the Unknown to Predict the Future of Fashion", http://multithreaded.stitchfix.com/blog/2015/09/17/deep-style/, Sep. 17, 2015, 9 Pages.
Yangyang, Xiang, "Computational Media Aesthetics for Media Synthesis", In Doctoral Dissertation of National University of Singapore, 2013, 220 Pages.
Wei, et al., "Fast Texture Synthesis using Tree-Structured Vector Quantization", In Proceedings of the 27th Annual Conference on Computer Graphics and Interactive Techniques, Jul. 23, 2000, pp. 479-488.
Lee, et al., "Pixel-Based Impressionistic Stylization", In International Journal of Multimedia and Ubiquitous Engineering, vol. 11, No. 1, Dec. 9, 2016, 14 Pages.
Liu, et al., "AutoStyle: Automatic Style Transfer from Image Collections to Users' Images", In Journal of Computer Graphics Forum, vol. 33, No. 4, Jul. 15, 2014, 11 Pages.
Mordvintsev, et al., "Inceptionism: Going Deeper into Neural Networks", https://ai.googleblog.com/2015/06/inceptionism-going-deeper-into-neural.html, Jun. 17, 2015, 6 Pages.
Aly, et al., "Image Up-Sampling Using Total-Variation Regularization With a New Observation Model", In Journal of IEEE Transactions on Image Processing, vol. 14, Issue 10, Oct. 2005, pp. 1647-1659.
Bengio, et al., "Representation Learning: A Review and New Perspectives", In Journal of IEEE Transactions on Pattern Analysis and Machine Intelligence, vol. 35, Issue 8, Aug. 2013, pp. 1798-1828.
Bengio, et al., "A Neural Probabilistic Language Model", In Journal of Machine Learning Research, Feb. 2003, pp. 1137-1155.
Boykov, et al., "Interactive Graph Cuts for Optimal Boundary & Region Segmentation of Objects in N-D Images", In Proceedings of International Conference on Computer Vision, Jul. 7, 2001, pp. 105-112.
Dumoulin, et al., "A Learned Representation For Artistic Style", In Journal of Computing Research Repository, Oct. 24, 2016, pp. 1-24.
Efros, et al., "Image Quilting for Texture Synthesis and Transfer", In Proceedings of 28th Annual Conference on Computer Graphics and Interactive Techniques, Aug. 12, 2001, pp. 341-346.
Efros, et al., "Texture Synthesis by Non-parametric Sampling", In Proceedings of IEEE International Conference on Computer Vision, Sep. 20, 1999, 6 Pages.
Elad, et al., "Style-Transfer via Texture-Synthesis", In Journal of Computing Research Repository, Sep. 20, 2016, pp. 1-48.
Frigo, et al., "Split and Match: Example-based Adaptive Patch Sampling for Unsupervised Style Transfer", In Proceedings of 26th IEEE Conference on Computer Vision and Pattern Recognition, Jun. 26, 2016, pp. 553-561.
Chen, et al., "StyleBank: An Explicit Representation for Neural Image Style Transfer", In Proceedings of IEEE Conference on Computer Vision and Pattern Recognition, Jul. 21, 2017, pp. 2770-2779.
Xue, et al., "Visual Dynamics: Probabilistic Future Frame Synthesis via Cross Convolutional Networks", In Journal of The Computing Research Repository, Jul. 9, 2016, 12 Pages.
Goodfellow, et al., "Generative Adversarial Nets", In Journal of Advances in Neural Information Processing Systems, Dec. 8, 2014, pp. 1-9.
He, et al., "Deep Residual Learning for Image Recognition", In Journal of Computing Research Repository, Dec. 2015, pp. 1-12.
Heeger, et al., "Pyramid-Based Texture Analysis Synthesis", In Proceedings of the 22nd Annual Cconference on Computer Graphics and Interactive Techniques, Sep. 15, 1999, pp. 229-238.
Hertzmann, et al., "Image Analogies", In Proceedings of the 28th Annual Conference on Computer Graphics and Interactive Techniques, Aug. 12, 2001, pp. 327-340.
Hinton, et al., "Reducing the Dimensionality of Data with Neural Networks", In Journal of Science, vol. 313, Jul. 28, 2006, pp. 504-507.
Ioffe, et al., "Batch Normalization Accelerating Deep Network Training by Reducing Internal Covariate Shift", In Journal of Computing Research Repository, Feb. 11, 2015, pp. 1-10.

(56) References Cited

OTHER PUBLICATIONS

Johnson, et al., "Perceptual Losses for Real-Time Style Transfer and Super-Resolution", In Journal of Computing Research Repository, Mar. 2016, pp. 1-18.

Kingma, et al., "Adam: A Method for Stochastic Optimization", In Journal of Computing Research Repository, Dec. 22, 2014, 9 Pages.

Krizhevsky, et al., "ImageNet Classification with Deep Convolutional Neural Networks", In Proceedings of 26th Annual Conference on Neural Information Processing Systems, Dec. 3, 2012, pp. 1-9.

Li, et al., "Combining Markov Random Fields and Convolutional Neural Networks for Image Synthesis", In Journal of the Computing Research Repository, Jan. 18, 2016, pp. 1-9.

Li, et al., "Precomputed Real-Time Texture Synthesis with Markovian Generative Adversarial Networks", In Proceedings of the 14th European Conference on Computer Vision, Oct. 8, 2016, 17 Pages.

Li, et al., "Motion Texture: A Two-Level Statistical Model for Character Motion Synthesis", In Proceedings of the 29th Annual Conference on Computer Graphics and Interactive Techniques, Jul. 23, 2002, pp. 465-472.

Liang, et al., "Realtime texture synthesis by patch-based sampling", In Journal of ACM Transactions on Graphics, vol. 20, Issue 3, Jul. 2001, pp. 127-150.

Lin, et al., "Scribblesup: Scribble-supervised convolutional networks for semantic segmentation", In Proceedings of IEEE Conference on Computer Vision and Pattern Recognition, Jun. 27, 2016, pp. 3159-3167.

Lin, et al., "Microsoft Coco: Common Objects in Context", In Proceedings of European Conference on Computer Vision, Sep. 6, 2014, pp. 1-16.

Long, et al., "Fully Convolutional Networks for Semantic Segmentation", In Proceedings of the IEEE Conference on Computer Vision and Pattern Recognition, Jun. 7, 2015, pp. 3431-3440.

Portilla, et al., "A Parametric Texture Model Based on Joint Statistics of Complex Wavelet Coefficients", In International Journal of Computer Vision, vol. 40, Issue 1, Oct. 2000, pp. 49-71.

Malik, et al., "Textons, Contours and Regions: Cue Integration in Image Segmentation", In Proceedings of the 7th IEEE International Conference on Computer Vision, vol. 2, Sep. 20, 1999, pp. 918-925.

Reed, et al., "Deep Visual Analogy-Making", In Proceedings of the 28th International Conference on Neural Information Processing Systems, Dec. 7, 2015, pp. 1-9.

Rother, et al., "Grabcut: Interactive Foreground Extraction using Iteraed Graph Cuts", In Journal of ACM Transactions on Graphics, vol. 23, Issue 3, Aug. 2004, pp. 309-314.

Russakovsky, et al., "ImageNet Large Scale Visual Recognition Challenge", In International Journal of Computer Vision, vol. 115, Issue 3, Dec. 2015, 43 Pages.

Selim, et al., "Painting Style Transfer for Head Portraits using Convolutional Neural Networks", In Journal of ACM Transactions on Graphics, vol. 35, Issue 4, Jul. 2016, 18 Pages.

Simonyan, et al., "Very Deep Convolutional Networks for Large-Scale Image Recognition", In Journal of the Computing Research Repository, Sep. 4, 2014, pp. 1-10.

Ulyanov, et al., "Texture Networks: Feed-forward Synthesis of Textures and Stylized Images.", In Proceedings of the 33rd International Conference on Machine Learning, Jun. 19, 2016, 9 Pages.

Ulyanov, et al., "Instance Normalization: The Missing Ingredient for Fast Stylization", In Journal of the Computing Research Repository, Jul. 27, 2016, 6 Pages.

Papari, et al., "Artistic Stereo Imaging by Edge Preserving Smoothing", In Proceeding of IEEE 13th Digital Signal Processing Workshop and 5th IEEE Signal Processing Education Workshop, Jan. 4, 2009, pp. 639-642.

"International Search Report and Written Opinion Issued in PCT Application No. PCT/US2019/012588", dated Jun. 13, 2019, 23 Pages.

Huang, et al., "Generation of Stero Oil Paintings from RGBD Images", In Proceeding of International Conference on Machine Vision and Information Technology, Feb. 17, 2017, pp. 64-68.

Gatys, et al., "Image Style Transfer Using Convolutional Neural Networks", In Proceeding of the IEEE Conference on Computer Vision and Pattern Recognition (CVPR), 2016, pp. 2414-2423.

Gatys, et al., "A Neural Algorithm of Artistic Style", In Repository of arxiv:1508.06576v2, Sep. 2, 2015, 16 Pages.

Taigman, et al., "Unsupervised Cross-Domain Image Generation" In Repository of arxiv:1611.02200v1, Nov. 7, 2016, 14 Pages.

Gatys, et al., "Texture Synthesis Using Convolutional Neural Networks", In Repository of arxiv:1505.07376v3, Nov. 6, 2015, 10 Pages.

International Search Report and Written Opinion Issued in PCT Application No. PCT/US207/065664, dated Mar. 9, 2018, 11 Pages.

"Second Office Action Issued in Chinese Patent Application No. 201611170887.4", dated Jun. 28, 2021, 28 Pages.

"First Office Action and Search Report Issued in Chinese Patent Application No. 201810036211.9", dated Aug. 19, 2020, 16 Pages.

"Second Office Action Issued in Chinese Patent Application No. 201810036211.9", (w/ English Translation), dated Feb. 9, 2021, 13 Pages.

"Third Office Action Issued in Chinese Patent Application No. 201611170887.4", dated Dec. 6, 2021, 23 Pages.

* cited by examiner

VISUAL STYLIZATION ON STEREOSCOPIC IMAGES

CROSS-REFERENCE TO RELATED APPLICATION

This application is a U.S. National Stage Filing under 35 U.S.C. 371 of International Patent Application Serial No. PCT/US2019/012588, filed Jan. 8, 2019, and published as WO 2019/139858 A1 on Jul. 18, 2019, which claims priority to Chinese Application No. 201810036211.9, filed Jan. 15, 2018, which applications and publication are incorporated herein by reference in their entirety.

BACKGROUND

Image stylization refers to transferring an original visual style of an image into other desired visual styles. A visual style of an image can be reflected by one-dimensional or multi-dimensional visual attributes presented in the image, including but not limited to colors, texture, brightness, lines, and the like. For example, a realistic image captured by an image capturing device or the like can be regarded as having a visual style, and artistic works, such as oil paintings, sketches, watercolor paintings, etc., may be regarded as having other different visual styles. When a visual style of an image is transferred, the content presented in the image will remain substantially unchanged. For example, if the image originally contains content such as buildings, people, sky, plants, or the like, the content is reserved substantially after the visual style transfer, but one-dimensional or multi-dimensional visual attributes of the content are changed such that the overall visual style of the image is different, for example transferred from a photo style to an oil painting style.

SUMMARY

In accordance with implementations of the subject matter described herein, there is proposed a solution of visual stylization of stereoscopic images. In the solution, a first feature map for a first source image and a second feature map for a second source image are extracted. The first and second source images correspond to a first view and a second view of a stereoscopic image, respectively. A first unidirectional disparity from the first source image to the second source image is determined based on the first and second source images. A first target image and a second target image having a specified visual style are generated by processing the first and second feature maps based on the first unidirectional disparity. Through the solution, a disparity between two source images of a stereoscopic image are taken into account when performing the visual style transfer, thereby maintaining a stereoscopic effect in the stereoscopic image consisting of the target images.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols refer to the same or similar elements.

DETAILED DESCRIPTION OF EMBODIMENTS

Figure 1:
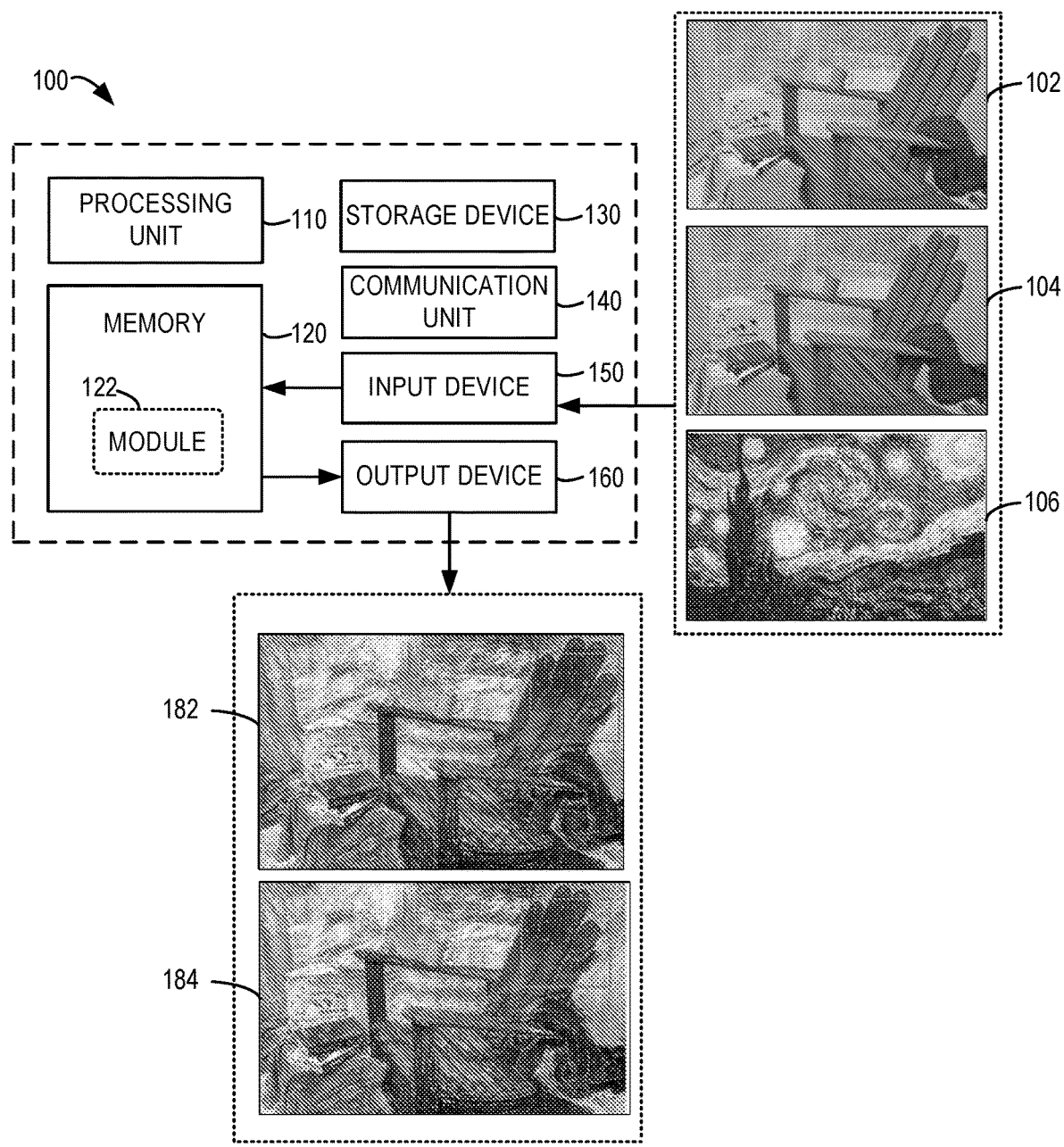
FIG. 1 illustrates a block diagram of a computer environment in which various implementations of the subject matter described herein can be implemented.

The subject matter described herein will now be discussed with reference to several example implementations. It is to be understood these implementations are discussed only for the purpose of enabling those skilled persons in the art to better understand and thus implement the subject matter described herein, rather than suggesting any limitations on the scope of the subject matter.

As used herein, the term "include" and its variants are to be read as open terms that mean "includes but is not limited to." The term "based on" is to be read as "based at least in part on." The terms "one implementation" and "an implementation" are to be read as "at least an implementation." The term "another implementation" is to be read as "at least one other implementation." The terms "first," "second," and the like may refer to different or same objects. Other definitions, either explicit or implicit, may be included below.

As mentioned above, a visual stylization transfer may be performed on images to produce famous image contents. Nowadays, a lot of technology researches focus on warping a visual style of a static 2-dimentional (2D) image or each frame of a video. With the development of visual content, static or dynamic stereoscopic images are more easily captured and reproduced. A stereoscopic image is also referred to as a 3-dimensional (3D) image, enabling a viewer to experience the effect of a stereoscopic 3D scene. A stereoscopic image consists of a pair of images, including an image corresponding to the left-eye view of the viewer and another image corresponding to the right-eye view of the viewer. There are some differences between the two images, and such disparities are to simulate the disparities generated when the viewer looks at the same scene with different eyes, which allows the viewer to experience the stereoscopic effect. A stereoscopic video refers to a video including a plurality of stereoscopic images that are continuous in time.

As the stereoscopic images are more easily captured and reproduced by various devices, it is desired to transfer the visual styles of the stereoscopic images, so as to present more diverse contents to the viewers. Although there are a lot of technologies for style transfer of static 2-dimensional (2D) images or dynamic 2D images in a video, there have been few studies on visual style transfer of stereoscopic images. If visual transfer is to be performed on stereoscopic images, one possible method is to apply the technology for visual stylization transfer of 2D images to each of the images forming the stereoscopic image independently. However, the inventors of the present application discovers that after the visual stylization transfer, some corresponding regions in the two images forming the stereoscopic image have different changes, such as different colors, texture and the like, although the colors and texture are all from the expected style. The style transfer result may induce problematic depth perception, which will easily lead to 3D visual fatigue to the viewers. Therefore, there emerges a need for a solution of visual style transfer for stereoscopic images.

Example Environment

Basic principles and several example implementations of the subject matter described herein will be described with reference to the drawings. FIG. 1 illustrates a block diagram of a computing device 100 in which various implementations of the subject matter described herein can be implemented. It would be appreciated that the computing device 100 as shown in FIG. 1 is only provided as an example and should not considered as any limitations on the functions and scope of the implementations described herein. As shown in FIG. 1, the computing device 100 includes a computing device 100 in form of a general-purpose computing device. Components of the computing device 100 may include, but are not limited to, one or more processors or processing units 110, a memory 120, a storage device 130, one or more communication units 140, one or more input devices 150 and one or more output devices 160.

In some implementations, the computing device 100 can be implemented as a variety of user terminals or serving terminals. A serving terminal may be a server provided by a respective service provider, large-scale computing device, or the like. The user terminal may be any type of mobile terminal, fixed terminal or portable terminal, such as mobile telephone, station, unit, device, multimedia computer, multimedia tablet, Internet node, communicator, desk-top computer, laptop computer, notable computer, netbook computer, tablet computer, personal communication system (PCS) device, personal navigation device, personal digital assistant (PDA), audio/video player, digital camera/video camera, positioning device, TV receiver, radio broadcast receiver, E-book device, gaming device or any combinations thereof, including accessories and peripherals of these devices or any combinations thereof. It would be appreciated that the computing device 100 can support any type of interface for a user (such as a "wearable" circuit).

The processing unit 110 may be a physical or virtual processor and can implement various processes based on programs stored in the memory 120. In a multi-processor system, a plurality of processing units execute computer executable instructions in parallel to improve the parallel processing capability of the computing device 100. The processing unit 110 may be also referred to as a central processing unit (CPU), a microprocessor, a controller, or a microcontroller.

The computing device 100 generally includes various computer storage media, which can be any available media accessible by the computing device 100, including but not limited to volatile and non-volatile media, and removable and non-removable media. The memory 120 can be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof. The storage device 130 can be any removable or non-removable media and may include machine-readable media, such as a memory, a flash drive, a disk, and any other media, which can be used for storing information and/or data and accessible in the computing device 100.

The computing device 100 may further include additional removable/non-removable, volatile/non-volatile memory media. Although not shown in FIG. 1, there can also be provided a disk drive for reading from or writing into a removable, non-volatile disk and an optical disk drive provided for reading from and writing into a removable, non-volatile disk. In such case, each drive is connected to the bus (not shown) via one or more data media interfaces.

The communication unit 140 communicates with a further computing device via communication media. Additionally, functions of the components in the computing device 100 can be implemented by a single computing cluster or multiple computing machines connected communicatively for communication. Therefore, the computing device 100 can be operated in a networking environment using a logical link with one or more other servers, network personal computers (PCs) or other general network nodes.

The input device 150 may include one or more input devices, such as a mouse, a keyboard, a tracking ball, a voice-input device, and the like. The output device 160 may include one or more output devices, such as a display, a loudspeaker, a printer, and the like. By means of the communication unit 140, the computing device 100 can further communicate with one or more external devices (not shown) such as the storage devices and display device, with one or more devices enabling the user to interact with the computing device 100, or any devices (such as a network card, a modem and the like) enabling the computing device 100 to communicate with one or more other computing devices, if required. Such communication is performed via an input/output (I/O) interface (not shown).

The computing device 100 can be provided for visual stylization of stereoscopic images in various implementations of the subject matter described herein. Thus, the computing device is also referred to as an "image processing device 100" hereinafter. The memory 120 may include one or more image processing modules 122 having one or more program instructions that can be accessed or operated by the processing unit 110 to implement functionalities of various implementations as described herein.

When performing visual stylization, the image processing device 100 may receive through the input device 150 a source image 102 and a source image 104 forming a stereoscopic image. The source image 102 and the source 104 correspond to a first view (for example, a left view) and a second view (for example, a right view) of the stereoscopic image, respectively. There are disparities between the source image 102 and the source image 104, allowing the viewers to experience the 3D effect of the scene during viewing. The input device 150 may receive an indication of a visual style 106, which is indicative of transferring the original visual style of the source images 102 and 104 to a specified visual style as desired. In the example of FIG. 1, the indication 106 is represented by an image having the expected visual style. The source images 102, 104 obtained by the input device 150 and the indication 106 are provided as inputs of the image processing module 122. The image processing module 122 applies the visual style indicated by the indication 106 on the source images 102 and 104, and outputs target images 182 and 184 after the style transfer. The target image 182 corresponds to the left view of the source image 102, and the target image 184 corresponds to the right view of the source image 104. The target images 182 and 184 form a stereoscopic image of the transferred visual style. The output device 160 may present the target images 182 and 184 to the viewer or transport them to other devices.

As described herein, a visual style of an image may be referred to as a style of the image in short, and may be embodied by one or more visual attributes presented in the image. Such visual attributes include, but are not limited to, colors, texture, brightness, lines, and the like in the image. Accordingly, a visual style of an image may involve one or more aspects of color matching, transitions between lightness and darkness, texture characteristics, line thickness, curve characteristics, and the like. In some implementations, images of different types may be considered as having different visual styles, for example, images captured by imaging devices, various types of sketches, oil paintings, watercolor paintings, and the like, created by artists.

It would be appreciated that the source images 102 and 104, the indication image 106, and the target images 182 and 184 as shown in FIG. 1 are only provided for purpose of illustration. In other examples, any source images forming the stereoscopic image can be processed, and any image indicating a specific visual style can be input and may generate different target images.

Work Principle and Learning Network-Based Examples

In accordance with the implementations of the subject matter described herein, there is proposed a solution of visual stylization of stereoscopic images. In the solution, respective feature maps of two source images forming a stereoscopic image are extracted and a unidirectional disparity from one source image to the other source image is determined. The determined unidirectional disparity is taken into account when the feature maps for the source images are transferred to target images having a specified visual style, so as to maintain such unidirectional disparity in the target images as much as possible. This is also beneficial for maintaining a stereoscopic effect in the stereoscopic image formed by the target images.

In some implementations, in performing the visual style transfer, a feature map of a view can be warped to the other view based on the unidirectional disparity, and the warped feature map is fused with the feature map of the other view. The fused feature map and the other unprocessed feature map are converted into a target image having a specified visual style. By warping and fusing, for a particular view, the visual style transfer is implemented with reference to the disparity with the other view, so as to reduce or avoid impact on the stereoscopic effect in the target image. It would be appreciated that for the first and second source images forming the stereoscopic image, the unidirectional disparity between two images in either direction may be taken into account.

In some other implementations, a first unidirectional disparity from the first source image to the second source image in the stereoscopic image and a second unidirectional disparity from the second source image to the first source image are taken into account in combination, to maintain a bidirectional disparity in the target images. This can further improve perception depth consistency between the target images, thereby maintaining a stereoscopic effect in the target images.

In some implementations, feature extraction of the source images and warping from the feature maps to a target image can be implemented based on a learning network. The learning network may for example be a convolutional neural network (CNN) having a good performance in image processing. In some implementations, the determination of disparity (disparities) of the source images may also be implemented by a respective learning network. In order to describe the subject matter more clearly, the learning network will be described below in combination. However, it would be appreciated that, in some other implementations, some or all functionalities described herein can also be implemented in other manners based on software or hardware.

A learning network may be referred to as a "neural network" or "learning model" herein. The terms "learning model," "learning network," "neural network," "model" and "network" can be used interchangeably below.

Figure 2:
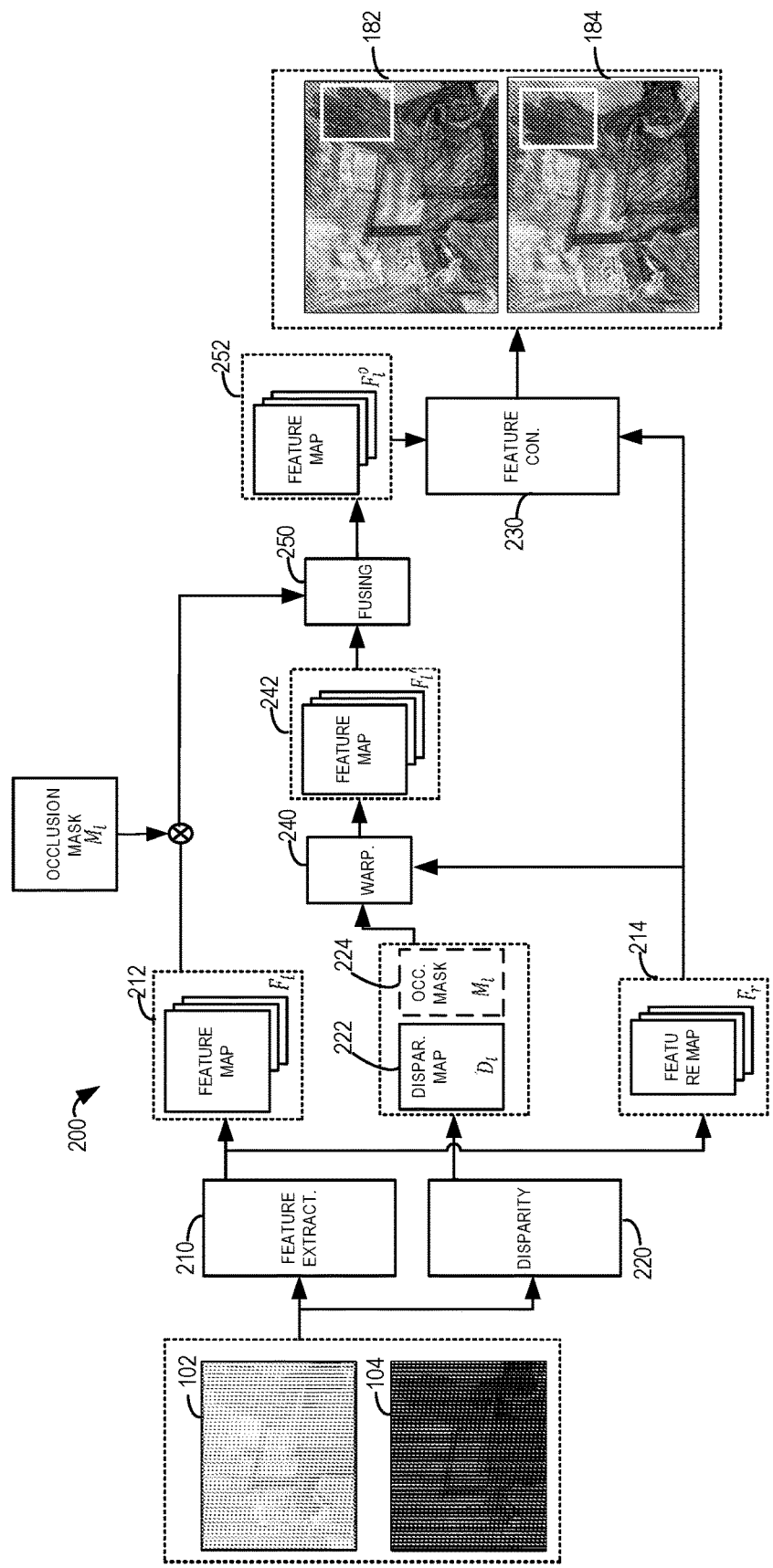
FIG. 2 illustrates a block diagram of a learning network for stylization of stereoscopic images in accordance with an implementation of the subject matter described herein.

Reference is now made to FIG. 2, which is an overall architecture of a learning network 200 for visual stylization of a stereoscopic image in accordance with some implementations of the subject matter described herein. The learning network 200 may be implemented at the image processing module 122 of the computing device 100 in FIG. 1. In the example of FIG. 2, the learning network 200 performs visual style transfer of a stereoscopic image on the basis of the unidirectional disparity.

As shown, the learning network 200 includes a feature sub-network 210 (also referred to as a "first sub-network," for convenience of discussion), a disparity sub-network 220 (which is also referred to as a "second sub-network," for convenience of discussion) and a feature conversion sub-network 230 (which is also referred to as a "third sub-network," for convenience of discussion). In the learning network 200, the feature extraction sub-network 210 and the feature conversion sub-network 230 are responsible for transferring a visual style of the source images 102 and 104, and the disparity sub-network 220 can estimate and indicate a disparity between the sources images 102 and 104 to maintain the disparity as much as possible during the visual stylization.

Specifically, the source images 102 and 104 are input to the feature extraction sub-network 210. The source images 102 and 104 form a stereoscopic image and correspond to a left view and a right view of the stereoscopic image, respectively. The feature extraction sub-network 210 is configured to extract one or more feature maps 212 (which is represented as $F_l$) for the source image 102 and one or more feature maps 214 (which is represented as $F_r$) for the source image 104. Each of the feature maps 212 and 214 indicates part of feature information of the source image 102 or 104, such as colors, contours, edges, lines, and the like, of one or more objects. The feature conversion sub-network 230 performs substantially inverse operations as the feature sub-network 210 to regenerate, based on the feature maps, target images 182 and 184 corresponding to the source images 102 and 104. Therefore, the feature extraction sub-network 210 sometimes may be referred to as an encoder, and the feature conversion sub-network 230 sometimes may be referred to as a decoder.

The example in FIG. 2 is an example implementation of maintaining a unidirectional disparity between the source images 102 and 104. For convenience of discussion, a unidirectional disparity from the source image 102 to the source image 104 is described as an example. However, it would be appreciated that a similar solution can also be obtained for maintaining the other unidirectional disparity from the source image 104 to the source image 102. Specifically, the disparity sub-network 220 is configured to determine a unidirectional disparity from the source image 102 to the source image 104 (which is also referred to as a "first unidirectional disparity," for convenience of discussion) based on the source images 102 and 104. In the specific example, the disparity sub-network 220 can generate a disparity map 222 (which is represented as $D_l$) to indicate the first unidirectional disparity. The disparity map 222 can indicate a shift degree from a pixel point of the source image 102 to a corresponding pixel point of the source image 104 at a pixel level, which is also referred to as a shift distance (for example, in unit of pixel). The disparity map 222 is applied to the feature map, and the dimension of the disparity map 222 thus may be bilinearly warped to be the same as the dimension of the feature maps 212 and 214.

The learning network 200 further includes a warping module 240. The disparity map ($D_l$) 222 and the feature map ($F_r$) 214 of the source image 104 are provided to the warping module 240. The warping module 240 is configured to warp the feature map 214 based on the disparity map 222, so as to warp the feature map 214 from the right view to the left view. It can be implemented by performing backward warping on the feature map 214, including: warping from the right view to the left view on the basis of the known disparity map 222 associated with the left view. The warping module 240 can output the warping feature 242 (which is represented as $F_l'$, also referred to as a first warped feature map for convenience of discussion), where $F_l'(p) = \mathcal{W}(F_r, D_l) = F_r(p+D_l(p))$, and $\mathcal{W}$ represents a warping operation. The learning network 200 further includes a fusing module 250 for fusing the warped feature map 242 with the feature map 212 of the source image 102 to obtain a fused feature map 252 for the left view.

In some implementations, mutual occlusion of objects in the source images 102 and 104 is taken into account. Due to the presence of the disparity, all or parts of some objects in the source images 102 and 104 are not always visible in both views. For example, some objects or parts of the objects visible in the source image 102 are probably occluded in the source image 104, and some objects or parts of the objects visible in the source image 104 are probably occluded in the source image 102. In view of the object occlusion, in some implementations, an occlusion mask 224 (which is represented as $M_l$) of the source image 102 may be determined, which indicates a part(s) of the source image 102 that is occluded in the source image 104. For example, the occlusion mask 224 can include pixel values of 0 and 1. For a given pixel p in the occlusion mask 224, if the pixel in the source image 102 and the pixel in the source image 104 corresponding to the pixel p are both visible, the pixel p in the occlusion masks 224 is 0; and if the pixel in the source image 102 corresponding to the pixel p is visible but the corresponding pixel in the source image 104 is occluded, the pixel p in the occlusion mask 224 is 1.

In some implementations, the occlusion mask 224 can be determined by the disparity sub-network 220 based on the source images 102 and 104. For example, the disparity sub-network 220 may determine the occlusion mask 224 by performing forward and backward consistency checks for the disparity from the source image 102 to the source image 104 and for the disparity from the source image 104 and the source image 102. In some implementations, the occlusion mask 224 can be determined in the feature space as corresponding to the dimension of the feature map 212. Through the occlusion mask 224, a partial feature map of the feature map 212 corresponding to the part(s) of the source image 102 that is occluded or non-occluded from the other view can be determined.

When the fusing module 250 performs the fusing, in order to maintain the corresponding disparity in the target images, a first partial feature map of the feature map 212 and a second partial feature map of the warped feature map 242 are fused to obtain a fused feature map 252 (which is represented as "$F_l^o$"), in which the first partial feature map of the feature map 212 corresponds to the part(s) of the source image 102 that is occluded in the source image 104, and the second partial feature map of the warped feature map 242 corresponds to the part(s) of the source image 102 that is not occluded in the source image 104. The first partial feature map and the second partial feature map can be determined by the occlusion mask 224 ($M_l$). A fusing operation in the fusing module 250 may be represented as: $F_l^o = M_l \odot F_l + (1-M_l) \odot F_l'$, where $\odot$ represents pixel-wise multiplication. In this manner, the respective disparities for the non-occluded parts from the other view can be maintained. For the parts that are only visible in the current view, the visual style transfer can be applied directly because the visual style transfer of the other view will not affect these parts of the image.

The fusing module 250 outputs a fused feature map 252. The fused feature map 252 corresponding to the source image 102 and the feature map 214 of the source image 104 are provided to the feature conversion sub-network 230. The feature conversion sub-network 230 is configured to process the feature maps 252 and 214 to generate the target images 182 and 184 having the specified visual style. Specifically, the feature map 252 can be converted by the sub-network 230 to the target image 182, and the feature map 214 can be converted by the feature conversion sub-network 230 to the target image 184.

In the implementations of the subject matter described herein, the specified visual style can be applied to the source images 102 and 104 in various manners to obtain the target images 182 and 184 that have that visual style. Such visual style transfer is implemented by the feature extraction sub-network 210, the feature conversion sub-network 220 or an additional sub-network. Various visual style applying solutions can be used in the learning network 200, and at the same time the disparity between different views of the stereoscopic image can be maintained through the disparity sub-network 220.

In some examples of the visual style transfer, the feature extraction sub-network 210 or other sub-networks can apply the specified visual style (for example, the visual style of the image 106) to the feature maps 212 and 214, and then process the feature maps 212 and 214 in the process as described above. In other implementations, a specified visual style can be applied to the feature map 212, the warped feature map 242 and the feature map 214 by other sub-networks, respectively. The feature maps 212 and 242 to which the specified visual style is applied are further fused, and are input, together with the feature map 214, into the feature conversion sub-network 230 to generate the target images 182 and 184. The expected visual style for example can be specified via the image 106 in FIG. 1 or in other manners such as an option selection, a text input, and the like. Typically, the visual style specified for the target images 182 and 184 can be different from the visual style presented in the source images 182 and 184.

Visual style transfer of stereoscopic images based on the learning network 200 has been described above. In some implementations, the feature extraction sub-network 210, the disparity sub-network 220 and the feature conversion sub-network 230 can consist of a plurality of layers of the neural network. A plurality of layers of a convolutional neural network (CNN) having a good performance in the image processing can be used to form the feature extraction sub-network 210. For example, the feature extraction sub-network 210 can consist of a plurality of convolutional layers for feature extraction. The feature conversion sub-network 230 can be arranged symmetrically. For example, if the feature extraction sub-network 210 includes a convolutional layer having a step size of 1 and two convolutional layers having a step size of 2, the feature conversion sub-network 230 can include two convolutional layers having a step size of ½ and a convolutional layer having a step size of 1. The disparity sub-network 220 can consist of a plurality of layers of the neural network similarly. Each layer can include a plurality of hidden nodes for processing an input from the preceding layer using an activation function with a non-linear transformation and provide output as an input of a next layer.

It would be appreciated that only some examples of functions that can be implemented by the sub-networks 210, 220 and 230 are provided in the use process. The sub-networks 210, 220 and 230 of the learning network have been trained as having respective parameters to implement the above functions. The training of the sub-networks will be described below. It would be appreciated that, in the learning network 200, the warping module 240 and the fusing module 250 can perform the warping and fusing functions without the training. In other implementations, these sub-networks may be arranged in other manners to accomplish the functions of extracting feature maps from source images, generating disparity maps of source images and converting the feature maps back to the image content space.

Extension to a Bidirectional Disparity

Figure 3:
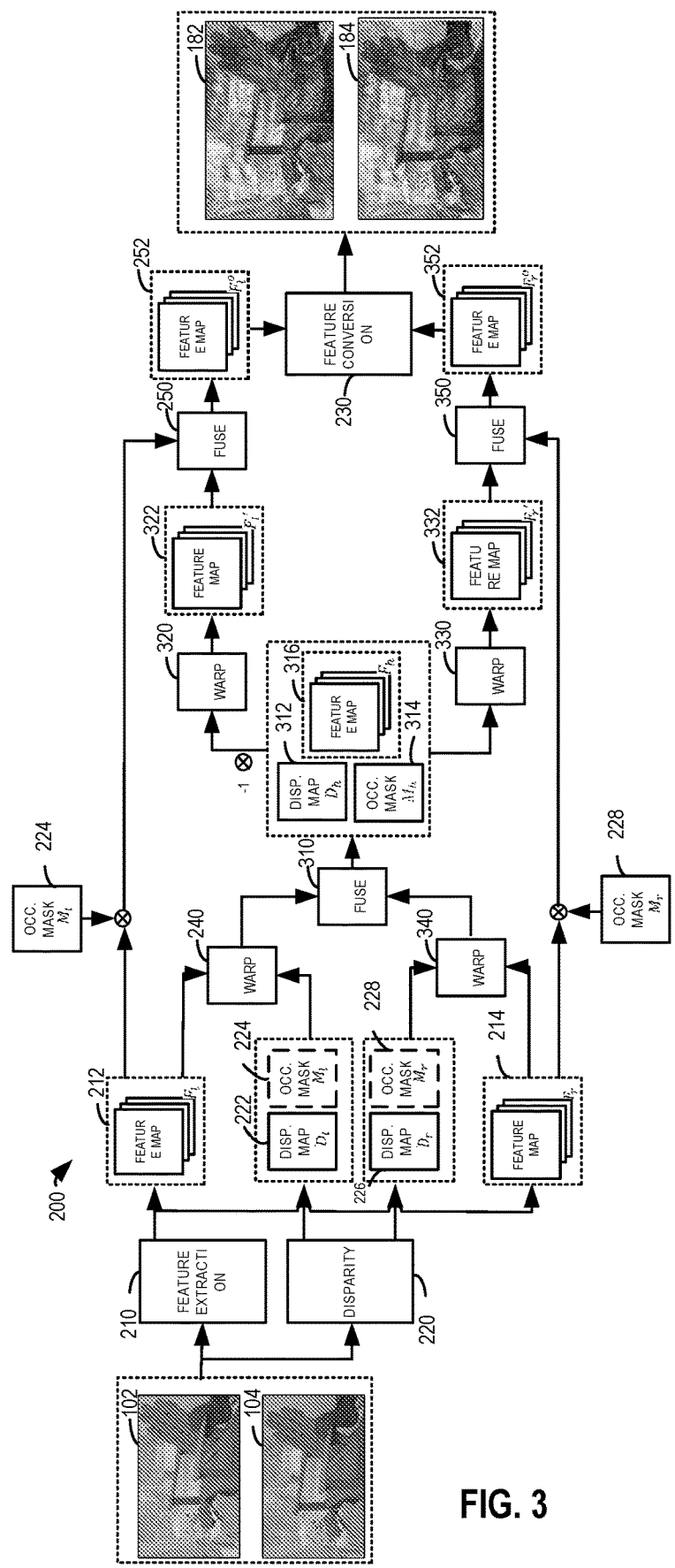
FIG. 3 illustrates a block diagram of a learning network for stylization of stereoscopic images in accordance with a further implementation of the subject matter described herein.

In the above implementation, it has been discussed the visual style transfer performed for a stereoscopic image in the case of maintaining a unidirectional disparity. In order to further reduce perception errors in the target images after the visual transfer and to maintain a stereoscopic effect of the target images, in some implementations, since the left view corresponding to the source image 102 and the right view corresponding to the source image are fully symmetric, it is also possible to maintain a symmetric bidirectional disparity from the source image 102 to the source image 104 and from the source image 104 to the source image 102. FIG. 3 shows a further example of the learning network 200 in which the disparity sub-network 220 determines unidirectional disparities in two directions.

Specifically, the feature extraction sub-network 210 extracts one or more feature maps 212 (which is represented as $F_l$) for the source image 102, and extract one or more feature maps 214 (which is represented as $F_r$) for the source image 104. In addition to determine the first unidirectional disparity from the source image 102 to the source image 104, the disparity sub-network 220 determines a unidirectional disparity from the source image 104 to the source image 102 (which is also referred to as a "second unidirectional disparity," for convenience of discussion) based on the source images 102 and 104. Similar to the first unidirectional disparity, the disparity sub-network 220 can also generate a disparity map 224 (which is represented as $D_r$) to indicate the second unidirectional disparity. The disparity map 226 can indicate a shift degree from a pixel point of the source image 104 to a corresponding pixel point of the source image 102 at a pixel level, which is also referred to as a shift distance (for example, in unit of pixel).

In some implementations of the subject matter described herein, in order to maintain a bidirectional disparity, both the feature map 212 corresponding to the left view and the feature map 214 corresponding to the right view are first warped to a middle domain, and then warped from the middle domain to the original views. Specifically, for the left view (l), the warping module 240 warps the feature map 214 from the right view to the left view based on the disparity map 222. Since the disparity map 222 associated with the left view and the feature map 214 associated with the right view are known, warping from the right view to the left view can be implemented by performing forward warping on the feature map 212.

During the warping, only a partial feature map (which is also referred to as a "first partial feature map," for convenience of discussion) in the feature map 212 corresponding to the parts of the source image 102 that are occluded in the source image 104 can be warped, and a partial feature map (which is also referred to as a "second partial feature map," for convenience of discussion) in the feature map 212 corresponding to the parts of the source image 102 that are occluded in the source image 104 is excluded. In order to determine the parts in the feature map 212 that are visible in both the source images 102 and 104, or the parts that are only visible in the source image 102 but occluded in the source image 104, the disparity sub-network 220 (or an extra sub-network) may determine the occlusion mask 224 (which is represented as $M_l$), as described with reference to FIG. 2.

In order to perform the warping to the middle domain, the warping module 240, when performing the warping, can warp the first partial feature map of the feature map 212 with a predetermined amount of the unidirectional disparity indicated by the disparity map 222. Typically, the unidirectional disparity indicated by the disparity map 222 represent a shift degree (i.e., a shift distance) from the source image 102 to the source image 104. In some implementations, the predetermined amount of the unidirectional disparity may be a half of the unidirectional disparity indicated by the disparity map 222. For example, for a given pixel p in the feature map 222, if the disparity map 222 indicates that during the warping the pixel p will be shifted to a pixel q in the warped feature map by a distance of d (in unit of pixel), the pixel p may be only shifted by a distance of d/2 in the warping module 240. The warping module 240 can perform the warping using a forward warping function. It would be appreciated that it is feasible to warp the feature map in other predetermined amounts of the unidirectional disparity.

For the right view (r), the learning network 200 further includes a warping module 340 for warping the feature map 212 from the left view to the right view based on the disparity map 226. Such warping can also be implemented by performing the forward warping on the feature map 214. The operation of the warping module 240 is symmetrical to that of the warping module 240. In the warping operation of the warping module 340, the partial feature maps of the feature map 214 corresponding to the parts of the source image 104 that are occluded and not occluded in the source image 102, respectively. Therefore, the disparity sub-network 220 (or other additional sub-networks) can be used to determine an occlusion mask 228 corresponding to the source image 104. The occlusion mask 228 can be determined as corresponding to the dimension of the feature map 214 in the feature space. By means of the occlusion mask 228, the partial feature maps in the feature map 214 corresponding to the parts of the source image 104 that are occluded and not occluded in the other view can be determined, respectively.

In order to warp to the middle domain, the learning network 200 further includes a fusing module 310 for fusing a warped feature map output by the warping module 240 (which is also referred to as a first intermediate feature map) and a warped feature map output by the warping module 340 (which is also referred to as a second intermediate feature map) to obtain an intermediate fused feature map 316 (represented as $F_h$). In some implementations, the fusing module 310 averages the corresponding pixel values in the first intermediate feature map and the second intermediate feature map to obtain the intermediated fused feature map 316. The warping of the feature map to the middle domain in the warping modules 240, 340 and fusing module 310 can be represented as follows:

$$D_l := \frac{D_l}{2}, D_r := \frac{D_r}{2} \quad (1)$$

$$F_h = \frac{\vec{W}(F_l, D_l, M_l) + \vec{W}(F_r, D_r, M_r)}{2} \quad (2)$$

where $\vec{W}(x,y,m)$ represents a forward warping function that warps x using the disparity map y and the guidance of the occlusion mask m. If it is supposed that $z=\vec{W}(x,y)$. represents a warped feature map, it can be determined that:

$$z(p) = \frac{\sum_p w_q \times x(q+y(q))}{\sum_q w_q}, \forall q: q+y(q) \in \mathcal{N}^8(p) \quad (3)$$

represents $\mathcal{N}^8(p)$ the eight-neighborhood of p, $w_q$ is a bilinear interpolation weight, making z both differentiable to x and y. With the guidance of the occlusion mask m, all the occluded pixels q are excluded in the forward warping procedure, which avoids the "many-to-one" mapping problem.

In order to further warp from the middle domain to the original views in the following process, a bidirectional disparity between the source image 102 and the source image 104 can be determined based on the disparity maps 222 and 226, so as to warp the intermediate feature maps from the middle domain to the original views. In some implementations, through the warping modules 240, 340 and the fusing module 310, the disparity maps 222 and 226 are warped to the middle domain using similar processing of the feature maps 212 and 214, to obtain an intermediate disparity map to indicate a bidirectional disparity. Specifically, for the left view (l), the warping module 240 can perform a half warping on the disparity map 222; that is, the disparity map 222 is warped with a half of the magnitude of the unidirectional disparity indicated by the disparity map 222 to obtain a first partial disparity map. The warping module 340 performs a similar operation for the disparity map 226 to obtain a second partial disparity map. During the warping, the forward warping can be performed, and the occluded pixels in the opposite views are excluded from the warping. The fusing module 310 fuses the first and second partial disparity maps warped by the warping modules 240, 340 to obtain an intermediate disparity map 312 (represented as $D_h$).

The intermediate disparity 312 indicates a bidirectional symmetric disparity between the source image 102 and the source image 104. In some implementations, the intermediate disparity map 312 indicates a symmetrical shift distance between a pixel point in the source image 102 and a corresponding pixel point in the source image 104. For example, for a given pixel $D_h(p)$ in the intermediate disparity map 312, a shift of a reverse distance—$D_h(p)$ may occur for a left view, and a shift of a forward distance+$D_h(p)$ may occur for a right view. The warping from the disparity map to the middle domain in the warping modules 240, 340 and the fusing module 310 can be represented as follows:

$$D_l := \frac{D_l}{2}, D_r := \frac{D_r}{2} \quad (4)$$

$$D_h = \frac{-\vec{W}(D_l, D_l, M_l) + \vec{W}(D_r, D_r, M_r)}{2} \quad (5)$$

In addition to the intermediate fused feature map 316 and the intermediate disparity map 312, an intermediate occlusion mask 314 (which is represented as $M_h$) may also be determined. The generation of the intermediate occlusion mask 314 is similar to the generation of the intermediate fused feature map 316 and the intermediate disparity map 312, including a half warping performed on the occlusion masks 224 and 226, respectively and the fusing the results. The intermediate occlusion mask 314 is provided to indicate the partial feature map corresponding to the parts visible both in the intermediate fused feature map 316 and in the source images 102 and 104.

After obtaining the intermediate fusing feature 316, the intermediate disparity map 312 and the intermediate occlusion mask 314 in the middle domain, the learning network 200 further includes a warping module 320, a warping module 330, the fusing module 250 and a fusing module 350 for performing warping from the middle domain to the original views. Specifically, the warping module 320 warps the intermediate fused feature map 316 to the left view based on the intermediate disparity map 312 to obtain a warped feature map 322 (which is represented by $F_l'$, also referred to as a first warped feature map). The warping module 330 warps the intermediate fused feature map 316 to the right view based on the intermediate disparity feature 312 to obtain the warped feature map 322 (which is represented by $F_r'$, also referred to as a second warped feature map). The warping in the warping modules 320 and 330 can be respectively represented as follows:

$$F_l' = \vec{W}(F_h, -D_h, M_h) \quad (6)$$

$$F_r' = \vec{W}(F_h, D_h, M_h) \quad (7)$$

The fusing module 250 fuses the feature map 212 with the corresponding warped feature map 322 in the left view, to generate a fused feature map 252 (which is represented by $F_l^o$, also referred to as a first fused feature map). The fusing may include fusing the partial feature map in the feature map 212 corresponding to the part(s) of the source image 102 that is occluded in the source image 104 with the partial feature map in the feature map 322 corresponding to the part(s) of the source image 102 that is not occluded in the source image 104. Similarly, the fusing module 350 fuses the feature map 214 and the corresponding warped feature map 322 in the right view, to generate a fused feature map 352 (which is represented by $F_r^o$, also referred to as a second fused feature map). Accordingly, the fusing in the fusing module 250 or 350 can be represented as:

$$F_v^o = M_v \odot F_v + (1-M_v) \odot F_v', v \in \{l,r\} \quad (8)$$

The fused feature maps 252 and 352 are fed into the feature conversion sub-network 230 to obtain the target images 182 and 184 having the visual style after the conversion. Specifically, the fused feature map 252 can be used to generate the target image 182, and the fused feature map 352 can be used to generate the target image 184.

As mentioned above, in the implementations of the subject matter described herein, a specified visual style can be applied to the source images 102 and 104 in various manners, so as to obtain the target images 182 and 184 having the visual style. Such visual style transfer is implemented by the feature extraction sub-network 210, the feature conversion sub-network 220 or an additional sub-network. Various visual style applying solutions can be used in the learning network 200, and at the same time the disparities between different views of the stereoscopic image can be maintained through the disparity sub-network 220.

By the visual style transfer for a stereoscopic image with the bidirectional disparity taken into account, symmetric disparities corresponding to left and right views can be maintained, thereby preserving a stereoscopic effect of a stereoscopic image consisting of the target images 182 and 184 and avoiding any perception loss resulting from the visual style transfer.

Training of the Learning Network

It has been discussed above the examples of visual style transfer of a stereoscopic image based on the learning network 200. In order to enable the learning network 200 to have a capability of implementing the visual style transfer and maintaining the unidirectional or bidirectional disparity, training images are used to train the network after constructing the architecture of the learning network 200. In the architecture of the learning network 200, the feature extraction sub-network 210, the disparity sub-network 220 and the feature conversion sub-network 230 are all required to be trained so as to determine the parameter sets therein.

In some implementations, the feature extraction sub-network 210 and the feature conversion sub-network 230 can be trained jointly, and the disparity sub-network 220 can be trained separately. During the training process, a training objective of the feature extraction sub-network 210 and the feature conversion sub-network 230 is to implement the functionalities of feature extraction, feature conversion and visual style transfer as described above. Therefore, the training data for training the sub-networks 210 and 230 may include stereoscopic images and corresponding reference stereoscopic images. The reference stereoscopic images have the respective transferred visual styles. The reference stereoscopic images may be regarded as the ground truth stereoscopic images after the style transfer. Each stereoscopic image includes a source image corresponding to a left view and a source image corresponding to a right view, and each reference stereoscopic image includes two reference images corresponding to the two views, respectively. In some implementations of the visual style transfer, reference images having corresponding visual styles can be used together for training. Such reference images may be 2D reference images.

During the training, a training objective of the disparity sub-network 220 is to implement the functionality of generating a disparity map (and an occlusion mask) from the source images as described above. Thus, the training data for training the disparity sub-network 220 include stereoscopic images and unidirectional disparities (for example, in form of disparity map) between the source images forming the stereoscopic images. The training data can further include reference occlusion masks. A reference disparity map and a reference occlusion mask indicate the ground truth disparity and occlusion mask for a pair of source images.

With the training data, values of the parameters in the feature sub-network 210, the disparity sub-network 220 and the feature conversion sub-network 230 can be constantly updated through iterative updates, such that the sub-networks 210, 220 and 230 obtained after convergence can implement their respective functionalities. The convergence of the iterative updates can be determined by an optimization target represented by a loss function. This loss function can be implemented by a sum of respective loss functions of the sub-networks 210, 220 and 230, which is represented as follows:

$$\mathcal{L}_{total} = \sum_{v \in \{l,r\}} (\alpha \mathcal{L}_{cont}^{v}(O_v, I_v) + \beta \mathcal{L}_{sty}^{v}(O_v, S) + \gamma \mathcal{L}_{disp}^{v}(O_v, D_v, M_v)). \quad (9)$$

where $\mathcal{L}_{total}$ is a total loss function of the learning network 200, $\mathcal{L}_{cont}^{v}$ is a content loss function, $\mathcal{L}_{sty}^{v}$ is a visual style loss function, $\mathcal{L}_{disp}^{v}$ is a disparity loss function, $v \in \{l,r\}$ represents a left view or a right view, $I_l$, $I_r$ represent a stereoscopic image, S represents a reference image having the visual style to be transferred to, $O_l$, $O_r$ represent a reference stereoscopic image, and where $O_l$, $O_r$ are visual style transfer results of $I_l$, $I_r$ and have the visual style of the reference image S.

In the above loss functions, the loss functions $\mathcal{L}_{cont}^{v}$ and $\mathcal{L}_{sty}^{v}$ are used as optimization objectives of the feature extraction sub-network 210 and the feature conversion sub-network 230, such that in the process of converting from an image content to a feature and converting from the feature to the image content, the difference related with the image content between an output target image and an input source image is minimal or lower than a threshold, and a difference related with the visual style between an output target image and a reference image having the corresponding visual style is minimal or lower than a threshold. It would be appreciated that the loss functions $\mathcal{L}_{cont}^{v}$ and $\mathcal{L}_{sty}^{v}$ used in training a learning network for visual style transfer of a static 2D image are also applicable in the implementations of the subject matter described herein. In an example, the loss function $\mathcal{L}_{cont}^{v}$ and $\mathcal{L}_{sty}^{v}$ can be represented as follows:

$$\mathcal{L}_{cont}^{v}(O_v, I_v) = \Sigma_{i \in \{l_c\}} \|F^i(O_v) - F^i(I_v)\|^2 \quad (10)$$

$$\mathcal{L}_{sty}^{v}(O_v, S) = \Sigma_{i \in \{l_s\}} \|G(F^i(O_v)) - G(F^i(S))\|^2 \quad (11)$$

where $F^i$ and G are a feature map and a Gram matrix computed from the layer i computed by the feature extraction sub-network 210 and the feature conversion sub-network 230, and $\{l_c\}$, $\{l_s\}$ respectively represent the layer numbers of the feature extraction sub-network 210 and the feature conversion sub-network 230.

In an example, a disparity loss function $\mathcal{L}_{disp}^{v}$ corresponding to a given view v can be defined as:

$$\mathcal{L}_{disp}^{v}(O_v, D_v, M_v) = (1 - M_v) \odot \|O_v - \widetilde{W}(O_{v*}, D_v)\|^2 \quad (12)$$

where $v \in \{l,r\}$, v* represents an opposite view of v (for example, if v is a left view, then v* is a right view, or vice versa). $\widetilde{W}(O_{v*}, D_v)$, represents warping $O_{v*}$ via bilinear interpolation using a disparity map $D_v$, i.e., $\widetilde{W}(O_{v*}, D_v)(p) = O_{v*}(p + D_v(p))$. $M^v$ represents an occlusion mask corresponding to a respective view to indicate occlusion of the source image of the respective view in the opposite view. When the disparity maps $D_v$ in both views are given, $M^v$ can be obtained by a forward consistency check. It would be appreciated that $\mathcal{L}_{disp}^{v}$ is symmetric for the left and right views and depends on the bidirectional disparity and the occlusion masks computed by the disparity sub-network.

In some implementations, when the loss function $\mathcal{L}_{disp}^{v}$ is computed, the disparities maps $D_v$ and occlusion masks $M^v$ in different dimensions (for example, 1/64 . . . 1/2 of the original dimension of the source images) can be computed, such that the loss function $\mathcal{L}_{disp}^{v}$ can be converged in different dimensions. Of course, in the process of use stage after the training, the disparity map $D_v$ and the occlusion mask $M^v$ generated by the disparity sub-network 220 have a maximum dimension (for example, the original dimension or ½ of the dimension of the original image). In each dimension, the loss function can be determined as:

$$\mathcal{L} = \sum_{v \in \{l,r\}} \mathcal{L}_d(M_v^g, D_v, D_v^g) + \lambda \mathcal{L}_o(W_v, M_v, M_v^g), \quad (13)$$

$$\mathcal{L}_d(M_v^g, D_v, D_v^g) = (1 - M_v^g) \odot \|D_v - D_v^g\|,$$

$$\mathcal{L}_o(W_v, M_v, M_v^g) =$$
$$-\frac{1}{n}\sum_i W_v(i)[M_v^g(i)\log(M_v(i)) + (1 - M_v^g(i))\log(1 - M_v(i))],$$

where the superscript g represents ground truth data, for example, $M_v^g$, represents a ground truth occlusion mask corresponding to the view v. $W_v$ is a smoothed weight map at a pixel level, where a pixel value in $W_v$ corresponding to a part of the source image that is occluded in the opposite view may be a ratio of a pixel number of the non-occluded parts and a pixel number of the occluded parts $$\left(\text{which is represented as } \frac{\#non.acc}{\#acc}\right),$$

while a pixel value corresponding to the parts of the source image that are not occluded in the opposite view can be set with 1. Note that ground truth data of $D_v$, $W_v$ having different dimensions (for example, $D_v^g$ and $M_v^g$) can be determined by a bilinear difference value of ground truth data of the original dimension. The loss function $\mathcal{L}_{disp}^v$ can be a sum of the loss function $\mathcal{L}$ on respective dimensions.

In some implementations, in addition to updating the sub-networks 210 and 230 by the loss functions $\mathcal{L}_{cont.}^v$ and $\mathcal{L}_{sty}^v$ and in addition to updating the sub-network 230 by the loss function $\mathcal{L}_{disp}^v$ (for example, updating them for several times), the three sub-networks can be jointly updated to allow the three sub-networks to operate more closely. The convergence objective of the joint updating is to approximate the total loss function $\mathcal{L}_{total}$ to a target value.

It has been discussed above the design of the loss functions in training the learning network 200 as shown in FIG. 3. For the unidirectional disparity-based learning network 200 as shown in FIG. 2, each sub-network of the learning network 200 can be updated likewise by the loss function to determine the parameter sets of the sub-networks.

Visual Style Transfer of Stereoscopic Video

Figure 4:
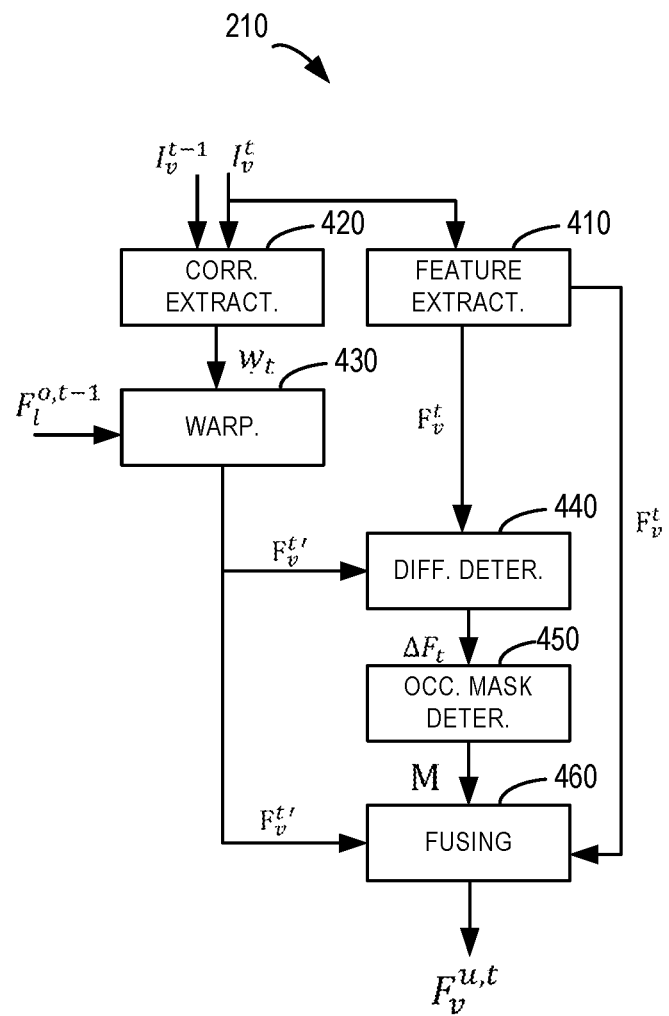
FIG. 4 illustrates a concrete block diagram of a feature extraction sub-network of the learning network in FIG. 2 in accordance with an implementation of the subject matter described herein.

The implementations in which the learning network 200 is applied to visual style transfer of a static stereoscopic image has been discussed above. In some implementations, for a stereoscopic video, visual style transfer can be performed for the stereoscopic images at the time line through the learning network 200 as described above. In some other implementations, since the stereoscopic video includes a plurality of stereoscopic images that are temporally correlated with each other, the temporal correlation of the stereoscopic images may also be considered when performing the visual style transfer for the current stereoscopic image. In some implementations, the time-domain correlation can be taken into account in the feature extraction sub-network 210, so as to influence the extracted feature maps for the original image. Specifically, when extracting the feature map for the source image at the current time, the extraction can be performed based on the feature map for the source image at the previous time (or via the warped feature map and the fused feature map of the learning network 200). FIG. 4 illustrates a structure of the feature extraction sub-network 210 in such implementations.

In the example of FIG. 4, the feature extraction sub-network 210 is provided for extracting features of a source image corresponding to a given view $v \in \{l,r\}$. The feature extraction sub-network 210 can include respective structures shown in FIG. 4 that are corresponding to left and right views, respectively. Herein, it is supposed that the source image corresponding to a given view input to the learning network at current time is $I_v^t$, the corresponding source image at the previous time is $I_v^{t-1}$. As shown in FIG. 4, the feature extraction sub-network 210 includes a feature extraction module 410 for extracting a feature map from the current source image $I_v^t$ directly. The feature map is extracted here without considering the source images at other times, and thus can also be referred to as a time-independent feature map (which is represented as $F_v^t$). The feature extraction sub-network 210 can further include a correlation extraction module 420 for determining, based on adjacent source images $I_v^{t-1}$ and $I_v^t$, a temporal correlation from the source image at the previous time t−1 to the source image at the current time t. In some implementations, the correlation extraction module 420 can determine a time flow map (which is represented as $w_v^t$) to indicate such temporal correlation. The time flow map indicates, at a pixel level, a forward temporal correlation between one pixel point in a source image at the previous time t−1 and a corresponding pixel point of the source image at the current time t.

The time flow map $w_v^t$ is used for warping the feature map $F_v^{o,t-1}$ corresponding to the source image $I_v^{t-1}$. The feature map $F_v^{o,t-1}$ is a fused feature map output by the fusing module 250 or 350 (depending on the given view) after the processing of the source image $I_v^{t-1}$ in the learning network 200. The feature extraction sub-network 210 includes a warping module 430 for performing the warping to obtain the warped feature map $F_v^{t'}$. The time-independent feature map $F_v^t$ and the warped feature map $F_v^{t'}$ are fed into a disparity determining module 440, to determine a difference $\Delta F_v^t$ between the two feature maps.

The difference $\Delta F_v^t$ is provided to an occlusion mask determining module 450 for determining an occlusion mask M. The occlusion mask M indicates parts of the current source image $I_v^t$ that are visible or invisible in the previous source image $I_v^{t-1}$. In some implementations, the occlusion mask M has a same dimension as the source image, and pixel values of regions corresponding to visible parts in both source images $I_v^t$ and $I_v^{t-1}$ are set with 1, while pixel values in other regions are set with 0. The occlusion mask M can indicate temporally traceable points or regions in the stereoscopic video.

The feature extraction sub-network 210 further includes a fusing module 460 for fusing the time-independent feature map $F_v^t$ and the feature map $F_v^{t'}$ obtained by warping the feature map related to the previous source image $I_v^{t-1}$. Such fusing is based on the occlusion mask M. Through the occlusion mask M, a first partial feature map of the feature map $F_v^t$ and a second partial feature map of the feature map $F_v^{t'}$ can be fused to obtain a fused feature map $F_v^{u,t}$. The first partial feature map is a partial feature map of the feature map $F_v^t$ corresponding to temporally untraceable parts of the source image $I_v^t$, which refers to feature parts corresponding to image contents that are newly emerging in the source image $I_v^t$. The second partial feature map is a partial feature map of the feature map $F_v^{t'}$ corresponding to temporally traceable parts of the source image $I_v^t$, which refers to feature parts corresponding to image contents of the source image $I_v^t$ that are preserved in time. The fusing in the fusing module 460 can be represented as:

$$F_v^{u,t} = (1-M) \odot F_v^t + M \odot F_v^{t'} \qquad (14)$$

The fused feature maps $F_l^{u,t}$ and $F_r^{u,t}$ then can be regarded as feature maps 212, 214 in the learning network as shown in FIG. 2 and FIG. 3. It would be appreciated that, at the initial time t=1, $F_l^{u,t}$, $F_r^{u,t}$ are time-independent maps extracted by the feature extraction module 410. In accordance with implementations of the subject matter described herein, for stereoscopic images from a stereoscopic video, in addition to maintaining spatial disparities of different views by the disparity sub-network 220 of the learning network 200, the temporal correlation is also maintained, such that the temporal correlation and the spatial disparities of the feature maps $F_l^{o,t}$, $F_r^{o,t}$ output by the fusing modules 250 and 350 of the learning network 200 can also be maintained.

In the example of FIG. 4, it would be appreciated that the feature extraction module 410 and the correlation extraction module 420 included in the feature extraction sub-network 210 also require training to determine their respective parameters, and other modules can be configured to perform their respective functionality without training the parameters. Hence, the feature extraction module 410 and the correlation extraction module 420 can also be referred to as a first portion and a second portion of the feature extraction sub-network 210, respectively. The feature extraction module 410 may also be trained together with the feature conversion sub-network 230. In some implementations, the correlation extraction module 420 can be trained separately. The parameters in the correlation extraction module 420 can be updated and optimized through the following loss function:

$$L_{cohe} = \sum_{v \in \{l,r\}} (1 - M_v^t) \odot \|O_v^t - W_{t-1}^t(O_v^{t-1})\|^2 \qquad (14)$$

Example Process

Figure 5:
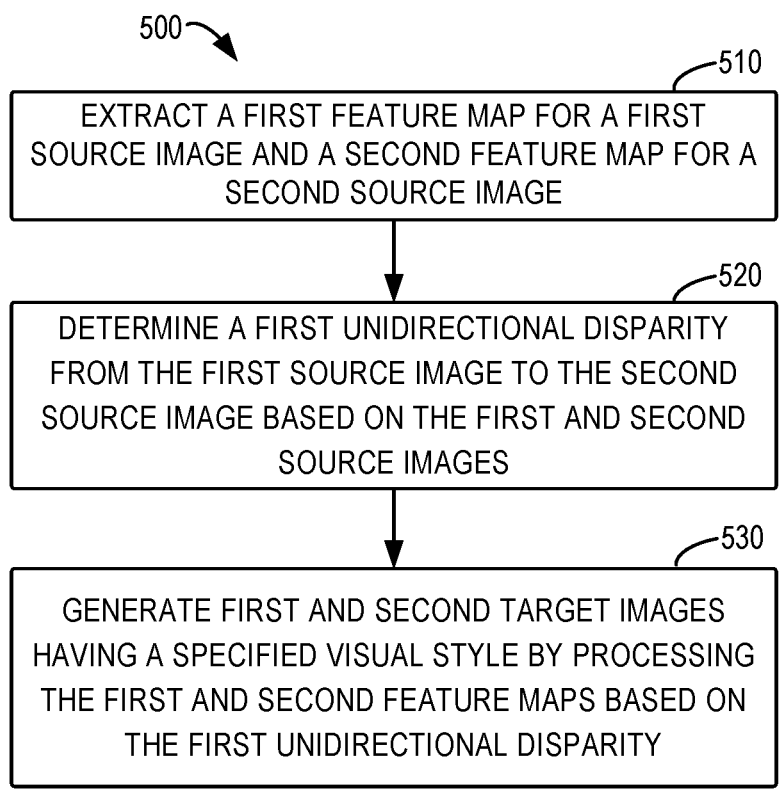
FIG. 5 illustrates a flowchart of a process of stylization of stereoscopic images in accordance with an implementation of the subject matter described herein.

FIG. 5 illustrates a flowchart of a process 500 of visual style transfer of a stereoscopic image in accordance with some implementations of the subject matter described herein. The process can be implemented by the computing device 100, for example at the image processing module 122 in the memory 100 of the computing device 100. At 510, a first feature map for a first source image and a second feature map for a second source image are extracted. The first and second source images correspond to a first view and a second view of the stereoscopic image, respectively. At 520, a first unidirectional disparity from the first source image to the second source image is determined based on the first and second source images. At 530, a first target image and a second target image having a specified visual style are generated by processing the first and second feature maps based on the first unidirectional disparity.

In some implementations, generating the first and second target images comprises: warping, based on the first unidirectional disparity, the second feature map from the second view to the first view to obtain a first warped feature map; fusing the first feature map with the first warped feature map to obtain a first fused feature map; and generating the first and second target images based on the first fused feature map and the second feature map.

In some implementations, generating the first and second target images based on the first fused feature map and the second feature map comprises: determining, based on the first and second source images, a second unidirectional disparity from the second source image to the first source image; warping, based on the second unidirectional disparity, the first feature map from the first view to the second view to obtain a second warped feature map; fusing the second feature map with the second warped feature map to obtain a second fused feature map; and converting the first fused feature map and the second fused feature map to the first and second target images.

In some implementations, warping the first feature map comprises: warping the first feature map with a predetermined amount of the first unidirectional disparity to obtain a first intermediate feature map; warping the second feature map with the predetermined amount of the second unidirectional disparity to obtain a second intermediate feature map; fusing the first intermediate feature map with the second intermediate feature map to obtain an intermediate fused feature map; determining a bidirectional disparity between the first and second source images based on the first unidirectional disparity and the second unidirectional disparity; and warping, based on the bidirectional disparity, the intermediate fused feature map to the first view to obtain the first warped feature map.

In some implementations, warping the second feature map comprises: warping, based on the bidirectional disparity, the intermediate fused feature map to the second view to obtain the second warped feature map.

In some implementations, the first unidirectional disparity and the second unidirectional disparity are represented by a first disparity map and a second disparity map, respectively, and determining the bidirectional disparity include: warping the first disparity map with the predetermined amount of the first unidirectional disparity to obtain the first partial disparity map; warping the second disparity map with the predetermined amount of the second unidirectional disparity to obtain the second partial disparity map; and determining the bidirectional disparity by fusing the first partial disparity map with the second partial disparity map.

In some implementations, the first and second source images are comprised in a stereoscopic video which further comprises a third source image corresponding to the first view before the first source image and a fourth source image corresponding to the second view before the second source image. Extracting the first and second feature maps comprises: extracting the first feature map based on the third source image and a third fused feature map corresponding to a third feature map for the third source image; and extracting the second feature map based on the fourth source image and a fourth fused feature map corresponding to a fourth feature map for the fourth source image.

In some implementations, extracting the first feature map based on the third source image and the third fused feature map comprises: extracting a time-independent feature map from the first source image; determining, based on the first and third source images, a temporal correlation from the third source image to the first source image; warping the third fused feature map based on the temporal correlation to obtain a third warped feature map; and fusing the time-independent feature map with the third warped feature map to obtain the first feature map.

In some implementations, fusing the first feature map with the first warped feature map comprises: determining a first partial feature map from the first feature map and a second partial feature map from the first warped feature map, the first partial feature map corresponding to a part of the first source image that is occluded in the second source image, the second partial feature map corresponding to a part of the first source image that is not occluded in the second source image; and fusing the first partial feature map with the second partial feature map.

In some implementations, determining the first partial feature map and the second partial feature map comprises: generating an occlusion mask based on the first and second source images, the occlusion mask indicating the part of the first source image that is occluded in the second source image; and determining the first partial feature map and the second partial feature map based on the occlusion mask.

Figure 6:
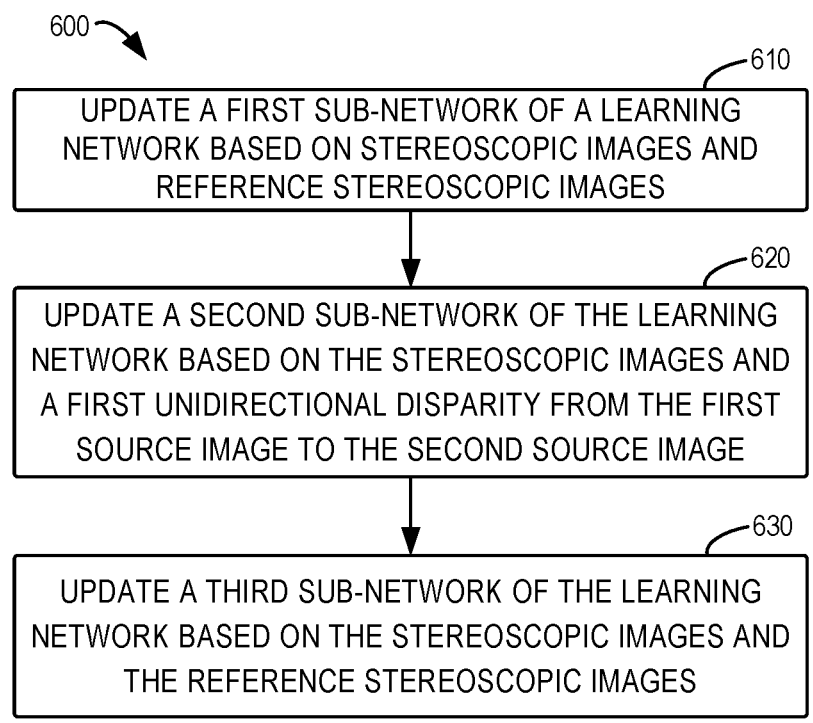
FIG. 6 illustrates a flowchart of a process of training a learning network in accordance with an implementation of the subject matter described herein.

FIG. 6 illustrates a flowchart of a process 600 of training a learning network of visual style transfer of stereoscopic images in accordance with some implementations of the subject matter described herein. The process 600 can be implemented by the computing device 100, for example implemented at the image processing module 122 in the memory 120 of the computing device 100. At 610, a first sub-network of a learning network is updated based on a reference stereoscopic image having a predetermined visual style and stereoscopic images each comprising a first source image corresponding to a first view and a second source image corresponding to a second view, to enable extrication of a first feature map for the first source image and a second feature map for the second source image using the first sub-network. At 620, a second sub-network of the learning network is updated based on the stereoscopic images and a first unidirectional disparity from the first source image to the second source image, to enable generation of the respective first unidirectional disparity using the second sub-network based on the first and second source images. At 630, a third sub-network of the learning network is updated based on the stereoscopic images and the reference stereoscopic image, to enable generation of the reference stereoscopic image by processing the first and second feature maps using the third sub-network based on the first unidirectional disparity.

In some implementations, updating the third sub-network comprises: warping the second feature map from the second view to the first view based on the first unidirectional disparity to obtain a first warped feature map; fusing the first warped feature with the first feature map to obtain a first fused feature map; and updating the third sub-network of the learning network, to enable generation of the first and second target images using the third sub-network based on the first fused feature map and the second feature map.

In some implementations, updating the second sub-network further comprises: updating the second sub-network based on a second unidirectional disparity from the second source image to the first source image, to generate the respective second unidirectional disparity using the second sub-network based on the first and second source images. In some implementations, updating the third sub-network further comprises: warping the first feature map from the first view to the second view, based on the second unidirectional disparity to obtain a second warped feature map; fusing the second feature map with the second warped feature map to obtain a second fused feature map; and updating the third sub-network, to convert the first fused feature map and the second fused feature map into the reference stereoscopic image using the third sub-network.

Example Implementations

Some example implementations of the subject matter described herein will be listed below.

In one aspect, there is provided a computer-implemented method in the subject matter described herein. The method comprises extracting a first feature map for a first source image and a second feature map for a second source image, the first and second source images corresponding to a first view and a second view of a stereoscopic image, respectively; determining, based on the first and second source images, a first unidirectional disparity from the first source image to the second source image; and generating a first target image and a second target image having a specified visual style by processing the first and second feature maps based on the first unidirectional disparity.

In some implementations, generating the first and second target images comprises: warping, based on the first unidirectional disparity, the second feature map from the second view to the first view to obtain a first warped feature map; fusing the first feature map with the first warped feature map to obtain a first fused feature map; and generating the first and second target images based on the first fused feature map and the second feature map.

In some implementations, generating the first and second target images based on the first fused feature map and the second feature map comprises: determining, based on the first and second source images, a second unidirectional disparity from the second source image to the first source image; warping, based on the second unidirectional disparity, the first feature map from the first view to the second view to obtain a second warped feature map; fusing the second feature map with the second warped feature map to obtain a second fused feature map; and converting the first fused feature map and the second fused feature map to the first and second target images.

In some implementations, warping the first feature map comprises: warping the first feature map with a predetermined amount of the first unidirectional disparity to obtain a first intermediate feature map; warping the second feature map with the predetermined amount of the second unidirectional disparity to obtain a second intermediate feature map; fusing the first intermediate feature map with the second intermediate feature map to obtain an intermediate fused feature map; determining a bidirectional disparity between the first and second source images based on the first unidirectional disparity and the second unidirectional disparity; and warping, based on the bidirectional disparity, the intermediate fused feature map to the first view to obtain the first warped feature map.

In some implementations, warping the second feature map comprises: warping, based on the bidirectional disparity, the intermediate fused feature map to the second view to obtain the second warped feature map.

In some implementations, the first unidirectional disparity and the second unidirectional disparity are represented by a first disparity map and a second disparity map, respectively, and determining the bidirectional disparity include: warping the first disparity map with the predetermined amount of the first unidirectional disparity to obtain the first partial disparity map; warping the second disparity map with the predetermined amount of the second unidirectional disparity to obtain the second partial disparity map; and determining the bidirectional disparity by fusing the first partial disparity map with the second partial disparity map.

In some implementations, the first and second source images are comprised in a stereoscopic video which further comprises a third source image corresponding to the first view before the first source image and a fourth source image corresponding to the second view before the second source image. Extracting the first and second feature maps comprises: extracting the first feature map based on the third source image and a third fused feature map corresponding to a third feature map for the third source image; and extracting the second feature map based on the fourth source image and a fourth fused feature map corresponding to a fourth feature map for the fourth source image.

In some implementations, extracting the first feature map based on the third source image and the third fused feature map comprises: extracting a time-independent feature map from the first source image; determining, based on the first and third source images, a temporal correlation from the third source image to the first source image; warping the third fused feature map based on the temporal correlation to obtain a third warped feature map; and fusing the time-independent feature map with the third warped feature map to obtain the first feature map.

In some implementations, fusing the first feature map with the first warped feature map comprises: determining a first partial feature map from the first feature map and a second partial feature map from the first warped feature map, the first partial feature map corresponding to a part of the first source image that is occluded in the second source image, the second partial feature map corresponding to a part of the first source image that is not occluded in the second source image; and fusing the first partial feature map with the second partial feature map.

In some implementations, determining the first partial feature map and the second partial feature map comprises: generating an occlusion mask based on the first and second source images, the occlusion mask indicating the part of the first source image that is occluded in the second source image; and determining the first partial feature map and the second partial feature map based on the occlusion mask.

In a further aspect, there is provided a device in the subject matter described herein. The device comprises a processing unit; and a memory coupled to the processing unit and having instructions stored thereon which, when executed by the processing unit, cause the processing unit to perform acts comprising: extracting a first feature map for a first source image and a second feature map for a second source image, the first and second source images corresponding to a first view and a second view of a stereoscopic image, respectively; determining, based on the first and second source images, a first unidirectional disparity from the first source image to the second source image; and generating a first target image and a second target image having a specified visual style by processing the first and second feature maps based on the first unidirectional disparity.

In some implementations, generating the first and second target images comprises: warping, based on the first unidirectional disparity, the second feature map from the second view to the first view to obtain a first warped feature map; fusing the first feature map with the first warped feature map to obtain a first fused feature map; and generating the first and second target images based on the first fused feature map and the second feature map.

In some implementations, generating the first and second target images based on the first fused feature map and the second feature map comprises: determining, based on the first and second source images, a second unidirectional disparity from the second source image to the first source image; warping, based on the second unidirectional disparity, the first feature map from the first view to the second view to obtain a second warped feature map; fusing the second feature map with the second warped feature map to obtain a second fused feature map; and converting the first fused feature map and the second fused feature map to the first and second target images.

In some implementations, warping the first feature map comprises: warping the first feature map with a predetermined amount of the first unidirectional disparity to obtain a first intermediate feature map; warping the second feature map with the predetermined amount of the second unidirectional disparity to obtain a second intermediate feature map; fusing the first intermediate feature map with the second intermediate feature map to obtain an intermediate fused feature map; determining a bidirectional disparity between the first and second source images based on the first unidirectional disparity and the second unidirectional disparity; and warping, based on the bidirectional disparity, the intermediate fused feature map to the first view to obtain the first warped feature map.

In some implementations, warping the second feature map comprises: warping, based on the bidirectional disparity, the intermediate fused feature map to the second view to obtain the second warped feature map.

In some implementations, the first unidirectional disparity and the second unidirectional disparity are represented by a first disparity map and a second disparity map, respectively, and determining the bidirectional disparity include: warping the first disparity map with the predetermined amount of the first unidirectional disparity to obtain the first partial disparity map; warping the second disparity map with the predetermined amount of the second unidirectional disparity to obtain the second partial disparity map; and determining the bidirectional disparity by fusing the first partial disparity map with the second partial disparity map.

In some implementations, the first and second source images are comprised in a stereoscopic video which further comprises a third source image corresponding to the first view before the first source image and a fourth source image corresponding to the second view before the second source image. Extracting the first and second feature maps comprises: extracting the first feature map based on the third source image and a third fused feature map corresponding to a third feature map for the third source image; and extracting the second feature map based on the fourth source image and a fourth fused feature map corresponding to a fourth feature map for the fourth source image.

In some implementations, extracting the first feature map based on the third source image and the third fused feature map comprises: extracting a time-independent feature map from the first source image; determining, based on the first and third source images, a temporal correlation from the third source image to the first source image; warping the third fused feature map based on the temporal correlation to obtain a third warped feature map; and fusing the time-independent feature map with the third warped feature map to obtain the first feature map.

In some implementations, fusing the first feature map with the first warped feature map comprises: determining a first partial feature map from the first feature map and a second partial feature map from the first warped feature map, the first partial feature map corresponding to a part of the first source image that is occluded in the second source image, the second partial feature map corresponding to a part of the first source image that is not occluded in the second source image; and fusing the first partial feature map with the second partial feature map.

In some implementations, determining the first partial feature map and the second partial feature map comprises: generating an occlusion mask based on the first and second source images, the occlusion mask indicating the part of the first source image that is occluded in the second source image; and determining the first partial feature map and the second partial feature map based on the occlusion mask.

In a further aspect, there is provided a computer-implemented method in the subject matter described herein. The method comprises updating a first sub-network of a learning network based on a reference stereoscopic image having a predetermined visual style and stereoscopic images each comprising a first source image corresponding to a first view and a second source image corresponding to a second view, to enable extrication of a first feature map for the first source image and a second feature map for the second source image using the first sub-network; updating a second sub-network of the learning network based on the stereoscopic images and a first unidirectional disparity from the first source image to the second source image, to enable generation of the respective first unidirectional disparity using the second sub-network based on the first and second source images; and updating a third sub-network of the learning network based on the stereoscopic images and the reference stereoscopic image, to enable generation of the reference stereoscopic image by processing the first and second feature maps using the third sub-network based on the first unidirectional disparity.

In some implementations, updating the third sub-network comprises: warping the second feature map from the second view to the first view based on the first unidirectional disparity to obtain a first warped feature map; fusing the first warped feature with the first feature map to obtain a first fused feature map; and updating the third sub-network of the learning network, to enable generation of the first and second target images using the third sub-network based on the first fused feature map and the second feature map In some implementations, updating the second sub-network further comprises: updating the second sub-network based on a second unidirectional disparity from the second source image to the first source image, to generate the respective second unidirectional disparity using the second sub-network based on the first and second source images. In some implementations, updating the third sub-network further comprises: warping the first feature map from the first view to the second view, based on the second unidirectional disparity to obtain a second warped feature map; fusing the second feature map with the second warped feature map to obtain a second fused feature map; and updating the third sub-network, to convert the first fused feature map and the second fused feature map into the reference stereoscopic image using the third sub-network.

In a further aspect, there is provided a device in the subject matter as described therein. The device comprises a processing unit; and a memory coupled to the processing unit and having instructions stored thereon which, when executed by the processing unit, cause the processing unit to perform acts comprising: updating a first sub-network of a learning network based on a reference stereoscopic image having a predetermined visual style and stereoscopic images each comprising a first source image corresponding to a first view and a second source image corresponding to a second view, to enable extrication of a first feature map for the first source image and a second feature map for the second source image using the first sub-network; updating a second sub-network of the learning network based on the stereoscopic images and a first unidirectional disparity from the first source image to the second source image, to enable generation of the respective first unidirectional disparity using the second sub-network based on the first and second source images; and updating a third sub-network of the learning network based on the stereoscopic images and the reference stereoscopic image, to enable generation of the reference stereoscopic image by processing the first and second feature maps using the third sub-network based on the first unidirectional disparity.

In some implementations, updating the third sub-network comprises: warping the second feature map from the second view to the first view based on the first unidirectional disparity to obtain a first warped feature map; fusing the first warped feature with the first feature map to obtain a first fused feature map; and updating the third sub-network of the learning network, to enable generation of the first and second target images using the third sub-network based on the first fused feature map and the second feature map In some implementations, updating the second sub-network further comprises: updating the second sub-network based on a second unidirectional disparity from the second source image to the first source image, to generate the respective second unidirectional disparity using the second sub-network based on the first and second source images. In some implementations, updating the third sub-network further comprises: warping the first feature map from the first view to the second view, based on the second unidirectional disparity to obtain a second warped feature map; fusing the second feature map with the second warped feature map to obtain a second fused feature map; and updating the third sub-network, to convert the first fused feature map and the second fused feature map into the reference stereoscopic image using the third sub-network.

In a further aspect, there is provided a computer program product in the subject matter described herein, the computer program product being tangibly stored on a non-transient computer storage medium and having machine-executable instructions which, when executed by a device, cause the device to perform the method according any of the above aspects.

The functionally described herein can be performed, at least in part, by one or more hardware logic components. For example, and without limitation, illustrative types of hardware logic components that can be used include: Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this subject matter described herein, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
   extracting a first feature map for a first source image and a second feature map for a second source image, the first and second source images corresponding to a first view and a second view of a stereoscopic image, respectively;
   determining, based on the first and second source images, a first unidirectional disparity from the first source image to the second source image; and
   generating a first target image and a second target image having a specified visual style by processing the first and second feature maps based on the first unidirectional disparity, wherein generating the first and second target images comprises:
   warping, based on the first unidirectional disparity, the second feature map from the second view to the first view to obtain a first warped feature map;
   fusing the first feature map with the first warped feature map to obtain a first fused feature map; and
   generating the first and second target images based on the first fused feature map and the second feature map.

2. The method of claim 1, wherein generating the first and second target images based on the first fused feature map and the second feature map comprises:
   determining, based on the first and second source images, a second unidirectional disparity from the second source image to the first source image;
   warping, based on the second unidirectional disparity, the first feature map from the first view to the second view to obtain a second warped feature map;
   fusing the second feature map with the second warped feature map to obtain a second fused feature map; and
   converting the first fused feature map and the second fused feature map to the first and second target images.

3. The method of claim 2, wherein warping the first feature map comprises:
   warping the first feature map with a predetermined amount of the first unidirectional disparity to obtain a first intermediate feature map;
   warping the second feature map with the predetermined amount of the second unidirectional disparity to obtain a second intermediate feature map;
   fusing the first intermediate feature map with the second intermediate feature map to obtain an intermediate fused feature map;
   determining a bidirectional disparity between the first and second source images based on the first unidirectional disparity and the second unidirectional disparity; and
   warping, based on the bidirectional disparity, the intermediate fused feature map to the first view to obtain the first warped feature map.

4. The method of claim 3, wherein warping the second feature map comprises:
   warping, based on the bidirectional disparity, the intermediate fused feature map to the second view to obtain the second warped feature map.

5. The method of claim 3, wherein the first unidirectional disparity and the second unidirectional disparity are represented by a first disparity map and a second disparity map, respectively, and wherein determining the bidirectional disparity comprises:
   warping the first disparity map with the predetermined amount of the first unidirectional disparity to obtain the first partial disparity map;
   warping the second disparity map with the predetermined amount of the second unidirectional disparity to obtain the second partial disparity map; and
   determining the bidirectional disparity by fusing the first partial disparity map with the second partial disparity map.

6. A computer-implemented method, comprising:
   extracting a first feature map for a first source image and a second feature map for a second source image, the first and second source images corresponding to a first view and a second view of a stereoscopic image, respectively;
   determining, based on the first and second source images, a first unidirectional disparity from the first source image to the second source image; and
   generating a first target image and a second target image having a specified visual style by processing the first and second feature maps based on the first unidirectional disparity, wherein the first and second source images are comprised in a stereoscopic video which further comprises a third source image corresponding to the first view before the first source image and a fourth source image corresponding to the second view before the second source image, and wherein extracting the first and second feature maps comprises:
   extracting the first feature map based on the third source image and a third fused feature map corresponding to a third feature map for the third source image; and
   extracting the second feature map based on the fourth source image and a fourth fused feature map corresponding to a fourth feature map for the fourth source image.

7. The method of claim 6, wherein extracting the first feature map based on the third source image and the third fused feature map comprises:
   extracting a time-independent feature map from the first source image;

determining, based on the first and third source images, a temporal correlation from the third source image to the first source image;

warping the third fused feature map based on the temporal correlation to obtain a third warped feature map; and fusing the time-independent feature map with the third warped feature map to obtain the first feature map.

8. The method of claim 1, wherein fusing the first feature map with the first warped feature map comprises:

determining a first partial feature map from the first feature map and a second partial feature map from the first warped feature map, the first partial feature map corresponding to a part of the first source image that is occluded in the second source image, the second partial feature map corresponding to a part of the first source image that is not occluded in the second source image; and fusing the first partial feature map with the second partial feature map.

9. The method of claim 8, wherein determining the first partial feature map and the second partial feature map comprises:

generating an occlusion mask based on the first and second source images, the occlusion mask indicating the part of the first source image that is occluded in the second source image; and determining the first partial feature map and the second partial feature map based on the occlusion mask.

10. A device, comprising:

a processing unit; and a memory coupled to the processing unit and having instructions stored thereon which, when executed by the processing unit, cause the processing unit to perform acts comprising:

extracting a first feature map for a first source image and a second feature map for a second source image; the first and second source images corresponding to a first view and a second view of a stereoscopic image, respectively;

determining, based on the first and second source images, a first unidirectional disparity from the first source image to the second source image; and generating a first target image and a second target image having a specified visual style by processing the first and second feature maps based on the first unidirectional disparity, wherein generating the first and second target images comprises:

warping, based on the first unidirectional disparity, the second feature map from the second view to the first view to obtain a first warped feature map;

fusing the first feature map with the first warped feature map to obtain a first fused feature map; and generating the first and second target images based on the first fused feature map and the second feature map.

11. The device of claim 10, wherein generating the first and second target images based on the first fused feature map and the second feature map comprises:

determining, based on the first and second source images, a second unidirectional disparity from the second source image to the first source image;

warping, based on the second unidirectional disparity; the first feature map from the first view to the second view to obtain a second warped feature map;

fusing the second feature map with the second warped feature map to obtain a second fused feature map; and converting the first fused feature map and the second fused feature map to the first and second target images.

12. The device of claim 11, wherein warping the first feature map comprises:

warping the first feature map with a predetermined amount of the first unidirectional disparity to obtain a first intermediate feature map;

warping the second feature map with the predetermined amount of the second unidirectional disparity to obtain a second intermediate feature map;

fusing the first intermediate feature map with the second intermediate feature map to obtain an intermediate fused feature map;

determining a bidirectional disparity between the first and second source images based on the first unidirectional disparity and the second unidirectional disparity; and warping, based on the bidirectional disparity, the intermediate fused feature map to the first view to obtain the first warped feature map.

13. A computer-implemented method, comprising:

updating a first sub-network of a learning network based on a reference stereoscopic image having a predetermined visual style and stereoscopic images each comprising a first source image corresponding to a first view and a second source image corresponding to a second view, to enable extrication of a first feature map for the first source image and a second feature map for the second source image using the first sub-network;

updating a second sub-network of the learning network based on the stereoscopic images and a first unidirectional disparity from the first source image to the second source image, to enable generation of the respective first unidirectional disparity using the second sub-network based on the first and second source images; and updating a third sub-network of the learning network based on the stereoscopic images and the reference stereoscopic image, to enable generation of the reference stereoscopic image by processing the first and second feature maps using the third sub-network based on the first unidirectional disparity, wherein generation of the of the reference stereoscopic image comprises:

warping, based on the first unidirectional disparity, the second feature map from the second view to the first view to obtain a first warped feature map;

fusing the first feature map with the first warped feature map to obtain a first fused feature map; and generating the reference stereoscopic image based on the first fused feature map and the second feature map.

14. A device, comprising:

a processing unit; and a memory coupled to the processing unit and having instructions stored thereon which; when executed by the processing unit, cause the processing unit to perform acts comprising:

extracting a first feature map for a first source image and a second feature map for a second source image, the first and second source images corresponding to a first view and a second view of a stereoscopic image, respectively;

determining, based on the first and second source images, a first unidirectional disparity from the first source image to the second source image; and generating a first target image and a second target image having a specified visual style by processing the first and second feature maps based on the first unidirectional disparity; wherein the first and second source images are comprised in a stereoscopic video which further comprises a third source image corresponding to the first view before the first source image and a fourth source image corresponding to the second view before the second source image, and wherein extracting the first and second feature maps comprises:

extracting the first feature map based on the third source image and a third fused feature map corresponding to a third feature map for the third source image; and extracting the second feature map based on the fourth source image and a fourth fused feature map corresponding to a fourth feature map for the fourth source image.

15. The device of claim 14, wherein extracting the first feature map based on the third source image and the third fused feature map comprises:

extracting a time-independent feature map from the first source image;

determining, based on the first and third source images, a temporal correlation from the third source image to the first source image;

warping the third fused feature map based on the temporal correlation to obtain a third warped feature map; and fusing the time-independent feature map with the third warped feature map to obtain the first feature map.

\* \* \* \* \*